United States Patent
Ando et al.

(10) Patent No.: US 9,667,818 B2
(45) Date of Patent: May 30, 2017

(54) FAX MAINTENANCE SYSTEM AND METHOD, AND NON-TRANSITORY COMPUTER READABLE MEDIUM

(71) Applicant: FUJI XEROX CO., LTD., Tokyo (JP)

(72) Inventors: Hiromoto Ando, Kanagawa (JP); Chie Ohara, Kanagawa (JP); Manabu Wada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/683,626

(22) Filed: Apr. 10, 2015

(65) Prior Publication Data

US 2016/0044183 A1 Feb. 11, 2016

(30) Foreign Application Priority Data

Aug. 7, 2014 (JP) .................................. 2014-161840

(51) Int. Cl.
| | |
|---|---|
| *G06F 3/12* | (2006.01) |
| *H04N 1/00* | (2006.01) |
| *H04N 1/40* | (2006.01) |
| *G06F 15/16* | (2006.01) |
| *G06F 15/173* | (2006.01) |

(52) U.S. Cl.
CPC . *H04N 1/00344* (2013.01); *H04N 2201/0039* (2013.01); *H04N 2201/0093* (2013.01)

(58) Field of Classification Search
None
See application file for complete search history.

(56) References Cited

U.S. PATENT DOCUMENTS

| | | | | |
|---|---|---|---|---|
| 5,539,530 A | * | 7/1996 | Reifman | H04N 1/00411 358/400 |
| 6,417,934 B1 | * | 7/2002 | Sadr-Salek | H04M 3/5307 358/442 |
| 6,570,667 B1 | * | 5/2003 | Hattori | H04N 1/00278 358/1.15 |
| 6,652,169 B2 | * | 11/2003 | Parry | G06F 9/4411 358/1.14 |
| 6,775,238 B1 | * | 8/2004 | Suzuki | H04L 12/2602 340/3.1 |
| 6,937,360 B1 | * | 8/2005 | Ikeda | H04N 1/32609 347/115 |
| 7,180,619 B2 | * | 2/2007 | Ferlitsch | G06F 3/121 358/1.13 |
| 7,305,440 B1 | * | 12/2007 | Saito | G06Q 10/107 358/1.15 |
| 7,369,281 B2 | * | 5/2008 | Baba | H04N 1/00204 358/404 |

(Continued)

FOREIGN PATENT DOCUMENTS

| | | |
|---|---|---|
| JP | 2003-330688 A | 11/2003 |
| JP | 2014-066982 A | 4/2014 |

*Primary Examiner* — Madelein Nguyen
(74) *Attorney, Agent, or Firm* — Oliff PLC

(57) ABSTRACT

A fax maintenance system includes a fax machine. The fax machine includes an operation fault detector and an output unit. The operation fault detector detects an operation fault of a predetermined type which occurs in the fax machine. The output unit outputs information indicating an occurrence of an operation fault of the predetermined type and setting information concerning an operation fault of the predetermined type.

5 Claims, 12 Drawing Sheets

(56) References Cited

U.S. PATENT DOCUMENTS

| | | | | |
|---|---|---|---|---|
| 7,383,321 B2* | 6/2008 | Moyer | G06F 3/1222 | 358/1.1 |
| 7,684,066 B2* | 3/2010 | Shirai | G06F 3/1207 | 358/1.13 |
| 7,822,642 B2* | 10/2010 | Takahashi | G06Q 30/0601 | 705/26.1 |
| 8,140,417 B2* | 3/2012 | Shibata | G06Q 20/10 | 194/205 |
| 9,036,173 B2* | 5/2015 | Thomas | H04N 1/00015 | 358/1.12 |
| 2001/0028473 A1* | 10/2001 | Yamasaki | G06F 11/0709 | 358/1.15 |
| 2004/0114194 A1* | 6/2004 | Eguchi | H04N 1/32561 | 358/400 |
| 2004/0252348 A1* | 12/2004 | Desai | H04N 1/00209 | 358/400 |
| 2004/0261010 A1* | 12/2004 | Matsuishi | G06F 17/30905 | 715/236 |
| 2004/0263894 A1* | 12/2004 | Barrett | H04N 1/00209 | 358/1.14 |
| 2005/0190404 A1* | 9/2005 | Nakamura | H04N 1/00209 | 358/1.15 |
| 2006/0047481 A1* | 3/2006 | Kanai | G06F 11/0709 | 702/184 |
| 2006/0077427 A1* | 4/2006 | Zhang | H04N 1/00204 | 358/1.15 |
| 2006/0078346 A1* | 4/2006 | Lovat | H04N 1/00204 | 399/79 |
| 2006/0080185 A1* | 4/2006 | Lovat | G06Q 30/0601 | 705/26.1 |
| 2006/0203283 A1* | 9/2006 | Fujimoto | G06F 3/1204 | 358/1.15 |
| 2007/0268526 A1* | 11/2007 | Ito | H04N 1/00214 | 358/403 |
| 2008/0117478 A1* | 5/2008 | Suzuki | H04N 1/32797 | 358/468 |
| 2009/0303524 A1* | 12/2009 | Kanekawa | G06F 9/5038 | 358/1.15 |
| 2009/0310160 A1* | 12/2009 | Kai | G06F 3/1222 | 358/1.9 |
| 2010/0110468 A1* | 5/2010 | Nagarajan | G03G 15/5079 | 358/1.14 |
| 2012/0069378 A1* | 3/2012 | VanDemark | B41J 2/32 | 358/1.14 |
| 2012/0174211 A1* | 7/2012 | Suzuki | H04L 63/0838 | 726/18 |
| 2013/0003111 A1* | 1/2013 | Mitsubori | H04L 43/0811 | 358/1.15 |
| 2013/0010328 A1* | 1/2013 | Naito | H04N 1/32704 | 358/1.15 |
| 2013/0057882 A1* | 3/2013 | Ohta | G06F 9/5011 | 358/1.9 |
| 2013/0185079 A1* | 7/2013 | Park | D06F 33/02 | 704/275 |
| 2014/0085660 A1 | 3/2014 | Kamisuwa et al. | | |
| 2015/0092249 A1* | 4/2015 | Watanabe | H04N 1/00206 | 358/406 |
| 2015/0199155 A1* | 7/2015 | Cho | G06F 3/1222 | 358/1.14 |

* cited by examiner

FAX MAINTENANCE SYSTEM AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-161840 filed Aug. 7, 2014.

BACKGROUND

Technical Field

The present invention relates to a fax maintenance system and method and a non-transitory computer readable medium.

SUMMARY

According to an aspect of the invention, there is provided a fax maintenance system including a fax machine. The fax machine includes an operation fault detector and an output unit. The operation fault detector detects an operation fault of a predetermined type which occurs in the fax machine. The output unit outputs information indicating an occurrence of an operation fault of the predetermined type and setting information concerning an operation fault of the predetermined type.

BRIEF DESCRIPTION OF THE DRAWINGS

An exemplary embodiment of the present invention will be described in detail based on the following figures, wherein.

DETAILED DESCRIPTION

Figure 1:
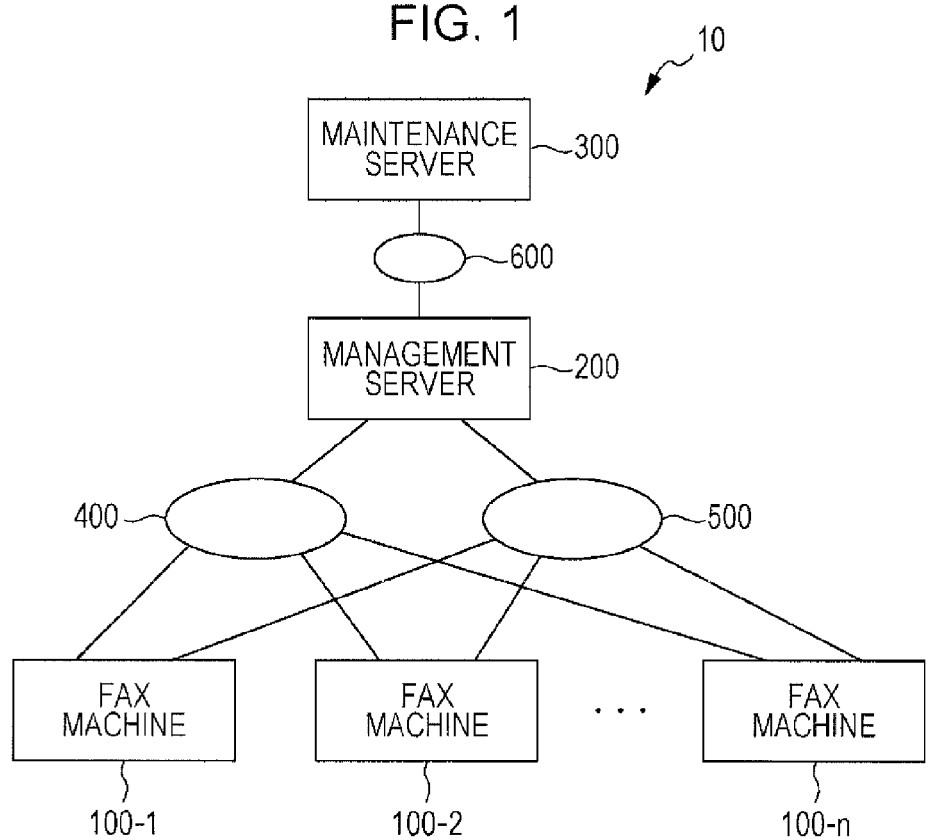
FIG. 1 illustrates a fax maintenance system according to an exemplary embodiment of the invention.

FIG. 1 illustrates a fax maintenance system 10 according to an exemplary embodiment of the invention. The fax maintenance system 10 includes fax machines 100 (100-1 through 100-$n$), a management server 200, and a maintenance server 300. Hereinafter, unless it is necessary to distinguish the fax machines 100-1 through 100-$n$ from each other, they are collectively referred to as the "fax machine 100" or "fax machines 100". The fax machines 100 are connected to the management server 200 via a fax communication line 400, and the fax machines 100 are connected to each other via the fax communication line 400. The fax machines 100 are also connected to the management server 200 via a data communication line 500. The management server 200 and the maintenance server 300 are connected to each other via a data communication line 600. The fax machine 100 is an information processing apparatus, such as a multifunction device including a fax function and a data communication function. The management server 200 and the maintenance server 300 are information processing apparatuses, such as personal computers.

The fax machine 100 performs fax communication with another fax machine 100 and the management server 200 via the fax communication line 400. Upon the occurrence of an operation fault, the fax machine 100 informs the management server 200 of the occurrence of an operation fault and setting information concerning the operation fault via the data communication line 500. The fax machine 100 also receives request information concerning processing for handling an operation fault (such as processing for fixing the problem of an operation fault or processing for checking details) from the management server 200 via the data communication line 500, and performs processing based on this request information.

The management server 200 manages the fax machines 100. Upon receiving information indicating the occurrence of an operation fault from the fax machine 100, the management server 200 informs the maintenance server 300 of the occurrence of an operation fault. The management server 200 receives request information for handling an operation fault which occurs in the fax machines 100 from the maintenance server 300 and stores the received request information. The management server 200 then sends the request information to the fax machine 100 in response to a request from the fax machine 100.

Upon receiving information indicating the occurrence of an operation fault in the fax machine 100 from the management server 200, the maintenance server 300 determines the cause of the operation fault, generates request information, and sends the generated request information to the management server 200.

Figure 2:
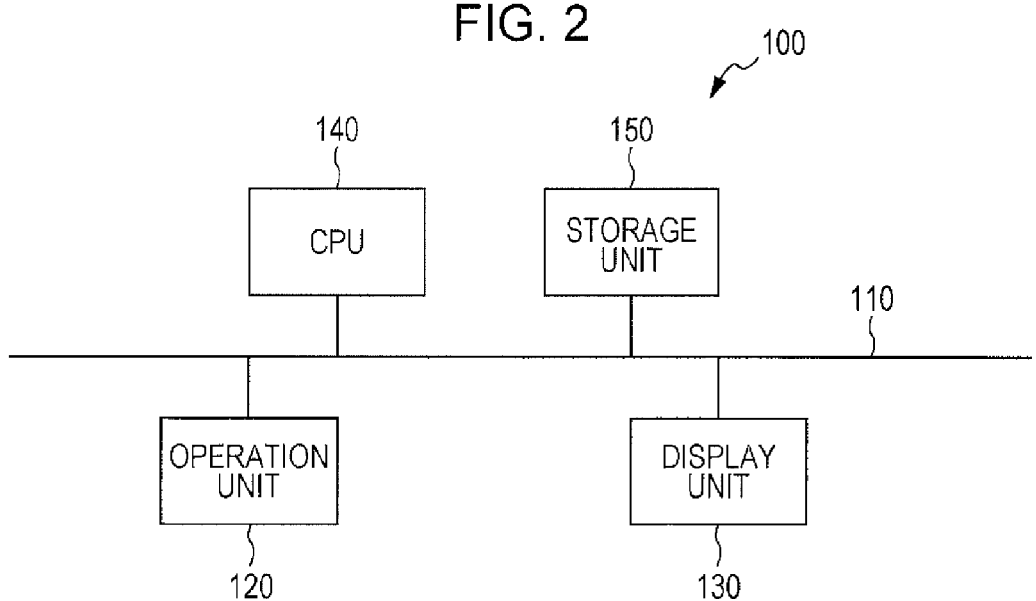
FIG. 2 is a block diagram illustrating an example of the hardware configuration of a fax machine according to an exemplary embodiment of the invention.

The configurations of the fax machine 100, the management server 200, and the maintenance server 300 of the fax maintenance system 10 will be described below. FIG. 2 is a block diagram illustrating an example of the hardware configuration of the fax machine 100 according to an exemplary embodiment of the invention. The fax machine 100 includes an operation unit 120, a display unit 130, a central processing unit (CPU) 140, and a storage unit 150, which are connected to each other via a bus 110. The operation unit 120 is constituted by fax number input keys, a sending key, and so on, and receives an operation performed by an operator of the fax machine 100. The display unit 130 is a display, such as a liquid crystal display. The CPU 140 is operated by a program stored in the storage unit 150, and implements various functions, which will be discussed later. The storage unit 150 is a storage element, such as a hard disk or a memory.

Figure 3:
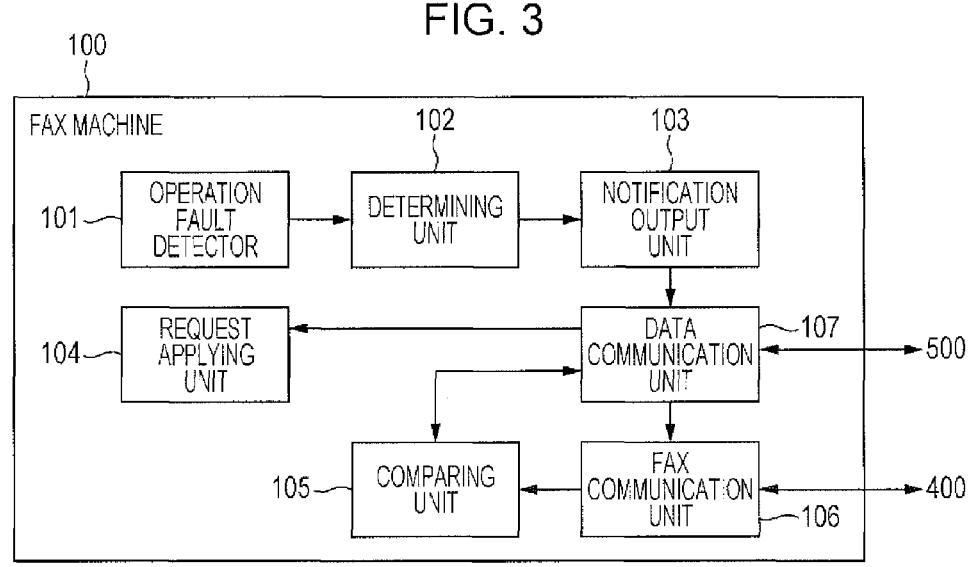
FIG. 3 is a functional block diagram illustrating examples of the functions of a fax machine according to an exemplary embodiment of the invention.

FIG. 3 is a functional block diagram illustrating examples of the functions of the fax machine 100 according to an exemplary embodiment of the invention. The fax machine 100 includes an operation fault detector 101, a determining unit 102, a notification output unit 103, a request applying unit 104, a comparing unit 105, a fax communication unit 106, and a data communication unit 107. These elements are functions implemented by the CPU 140, which is operated by the program stored in the storage unit 150.

The operation fault detector 101 detects operation faults of predetermined types which occur in the fax machine 100. Operation faults of predetermined types are, for example, situations where fax sending or reception is not correctly performed due to a setting error at the time of installation of the fax machine 10, a line fault, an input error of a telephone number, and a communication fault.

The determining unit 102 makes a determination as to whether or not to inform the management server 200 of the occurrence of an operation fault if this operation fault has been detected by the operation fault detector 101. The determining unit 102 first checks the number of times an operation fault has been detected by the operation fault detector 101, and determines whether the detected number is equal to or greater than a predetermined number. If the detected number is equal to or greater than a predetermined number, the determining unit 102 further makes a determination as to whether the time elapsed after the previous notification of this operation fault has been sent to the management server 200 is equal to or greater than a predetermined time. If the predetermined time has elapsed, the determining unit 102 decides to send a notification to the management server 200. If the detected number is smaller than the predetermined number or if the predetermined time has not yet elapsed, the determining unit 102 decides not to send a notification to the management server 200. The reason for this is as follows. If the same notification has already been sent to the management server 200, the management server 200 and the maintenance server 300 may be currently handling the operation fault. Moreover, if similar notifications are sent multiple times for a short period of time, the burden on the management server 200 and the maintenance server 300 may be unnecessarily increased.

If the determining unit 102 has decided to send a notification to the management server 200, the notification output unit 103 obtains setting information concerning the detected operation fault and outputs information indicating the occurrence of this operation fault and the obtained setting information to the data communication unit 107. Setting information to be obtained is, for example, information indicating the content of current settings if the operation fault is due to a setting error, information indicating the connection status of a line if the operation fault is due to a line fault, the input telephone number or the input method (whether the telephone number has been automatically input from a database or manually input) if the operation fault is due to an input error of the telephone number, or information indicating the communication status or the content of a communication error which has been reported if the operation fault is due to a communication fault. These items of information are sent to the management server 200 by the data communication unit 107, which will be discussed later.

The request applying unit 104 executes processing based on request information received from the management server 200. The request information is information indicating processing to be executed for handling an operation fault by the fax machine 100, and is generated by the maintenance server 300 upon receiving a notification of the occurrence of an operation fault from the fax machine 100 via the management server 200. The content of the request information is, for example, processing for changing at least part of the content of current settings if the operation fault is due to a setting error, processing for instructing a user to check the connection of a line if the operation fault is due to a line fault, processing for instructing a user to check the telephone number or the input method if the operation fault is due to an input error of the telephone number, or processing for instructing the user to check with a communication provider if the operation fault is due to a communication fault. The request information is received from the management server 200 in the form of, for example, a compressed executable file, and the request applying unit 104 decompresses the received file and executes it.

The comparing unit 105 compares an actual operation checking image received via the fax communication line 400 with an operation checking image represented by image data received via the data communication line 500 in advance, by performing known image recognition processing and comparing processing for the recognition results. If an operation fault, such as a fax reception error, has been detected in the fax machine 100, the comparing unit 105 performs the above-described comparing processing for checking whether or not the problem of the operation fault has been fixed after applying the request information by the request applying unit 104, and informs the management server 200 of the comparison result via the data communication unit 107 and the data communication line 500.

The fax communication unit 106 performs fax communication with the management server 200 via the fax communication line 400. If an operation fault, such as a fax reception error, is detected in the fax machine 100, after the request applying unit 104 has applied request information, the fax communication unit 106 receives an operation checking image from the management server 200 via the fax communication line 400 and outputs the operation checking image to the comparing unit 105. If an operation fault, such as a fax sending error, is detected in the fax machine 100, after the request applying unit 104 has applied request information, the fax communication unit 106 sends an operation checking image represented by image data received from the management server 200 via the data communication line 500 to the management server 200 via the fax communication line 400.

The data communication unit 107 performs data communication with the management server 200 via the data communication line 500. The data communication unit 107 sends data input from the individual elements of the fax machine 100 to the management server 200 and also outputs data received from the management server 200 to the individual elements of the fax machine 100. Concerning request information to be output to the request applying unit 104, the data communication unit 107 performs polling at a predetermined timing, and if request information is stored in the management server 200, the data communication unit 107 receives the request information and outputs it to the request applying unit 104. With this operation, even if a firewall is set in the data communication line 500, request information can be received in the fax machine 100.

Figure 4:
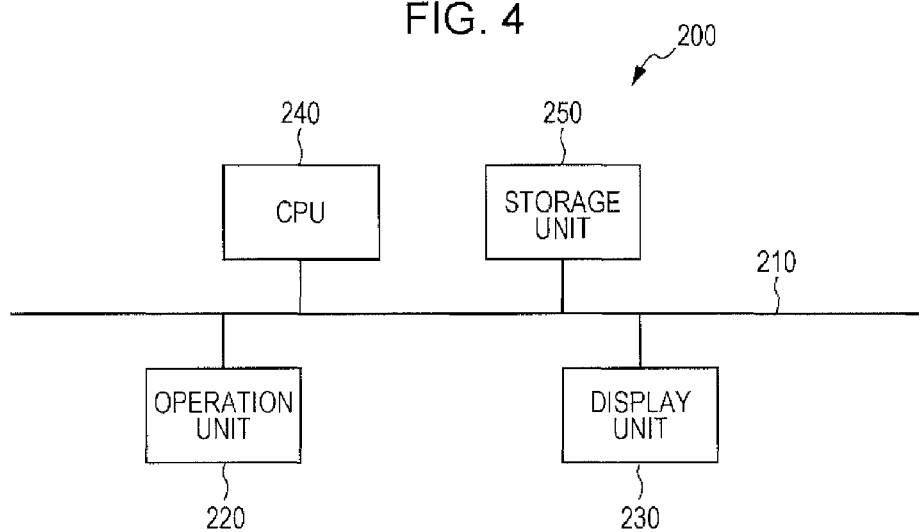
FIG. 4 is a block diagram illustrating an example of the hardware configuration of a management server according to an exemplary embodiment of the invention.

FIG. 4 is a block diagram illustrating an example of the hardware configuration of the management server 200 according to an exemplary embodiment of the invention. The management server 200 includes an operation unit 220, a display unit 230, a CPU 240, and a storage unit 250, which are connected to each other via a bus 210. The operation unit 220 is constituted by a keyboard, a mouse, and so on, and receives an operation performed by an operator of the management server 200. The display unit 230 is a display, such as a liquid crystal display. The CPU 240 is operated by a program stored in the storage unit 250, and implements various functions, which will be discussed later. The storage unit 250 is a storage element, such as a hard disk or a memory.

Figure 5:
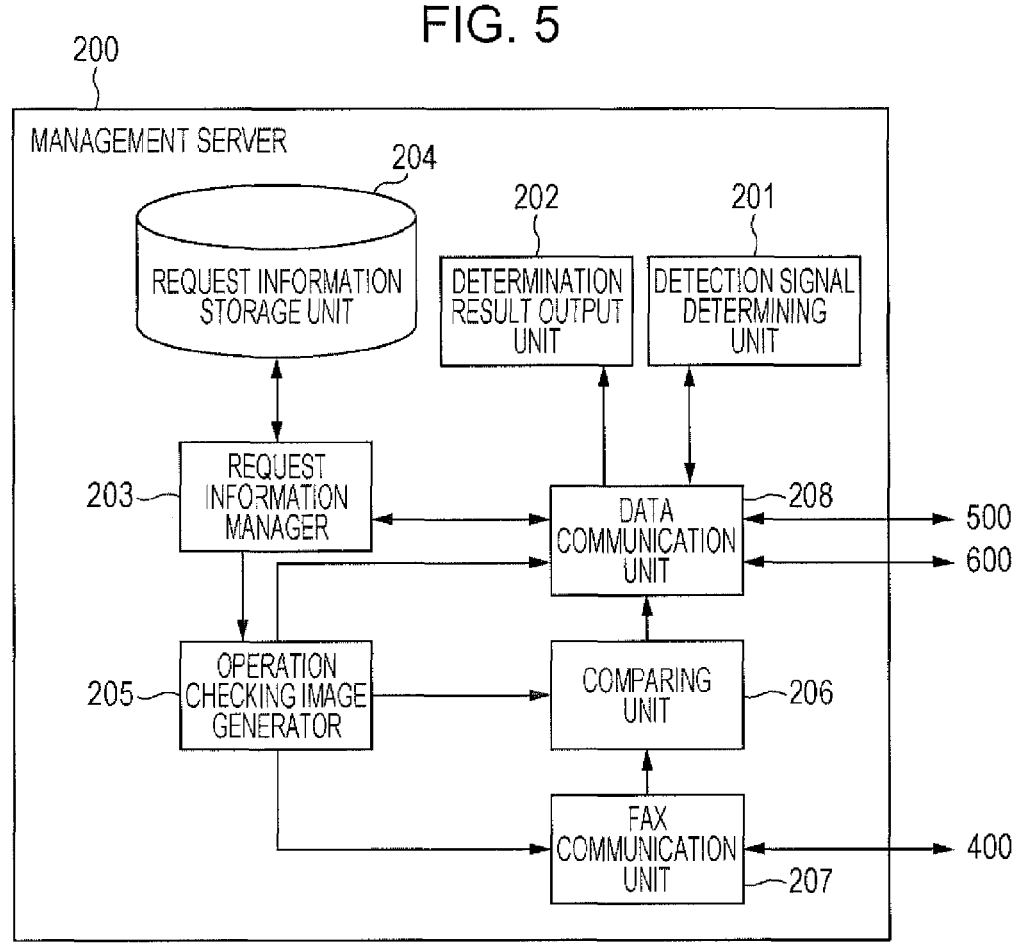
FIG. 5 is a functional block diagram illustrating examples of the functions of a management server according to an exemplary embodiment of the invention.

FIG. 5 is a functional block diagram illustrating examples of the functions of the management server 200 according to an exemplary embodiment of the invention. The management server 200 includes a detection signal determining unit 201, a determination result output unit 202, a request information manager 203, a request information storage unit 204, an operation checking image generator 205, a comparing unit 206, a fax communication unit 207, and a data communication unit 208. The detection signal determining unit 201, the determination result output unit 202, the request information manager 203, the operation checking image generator 205, the comparing unit 206, the fax communication unit 207, and the data communication unit 208 are functions implemented by the CPU 240 which is operated by the program stored in the storage unit 250. The request information storage unit 204 is constituted by a storage element, such as a hard disk or a memory, which forms the storage unit 250.

The detection signal determining unit 201 determines whether or not information received from the fax machine 100 is information indicating the occurrence of an operation fault and setting information. If information received from the fax machine 100 is information indicating the occurrence of an operation fault and setting information, the detection signal determining unit 201 sends such information to the maintenance server 300 via the data communication unit 208.

The determination result output unit 202 displays a determination result concerning the cause of an operation fault sent from the maintenance server 300 on, for example, the display unit 230 of the management server 200, so as to present information to the administrator of the management server 200.

The request information manager 203 stores request information received from the maintenance server 300 in the request information storage unit 204 and also sends corresponding request information to the fax machine 100 via the data communication unit 208 in response to polling performed by the fax machine 100.

The request information storage unit 204 stores request information received from the maintenance server 300 therein.

The operation checking image generator 205 generates an operation checking image on the basis of request information stored in the request information storage unit 204 and obtained by the request information manager 203 (to be executed by the fax machine 100). An operation checking image is generated such that it contains information uniquely appended to this image, such as a barcode, and is authenticated separately from other images. If an operation fault which occurs in the fax machine 100 is a reception error, image data representing the generated operation checking image is sent to the fax machine 100 via the data communication line 500, and also, the operation checking image is sent to the fax machine 100 from the fax communication unit 207 via the fax communication line 400. If an operation fault which occurs in the fax machine 100 is a sending error, image data representing the generated operation checking image is sent to the fax machine 100 via the data communication line 500, and also, the operation checking image is sent to the comparing unit 206.

The comparing unit 206 compares an actual operation checking image received from the fax machine 100 via the fax communication line 400 with an operation checking image generated by the operation checking image generator 205, by performing known image recognition processing and comparing processing for the recognition results. If an operation fault, such as a fax sending error, has been detected in the fax machine 100, the comparing unit 206 performs the above-described comparing processing for checking whether or not the problem of the operation fault has been fixed after the fax machine 100 has applied request information.

The fax communication unit 207 performs fax communication with the fax machine 100 via the fax communication line 400. If an operation fault, such as a fax reception error, is detected in the fax machine 100, after the fax machine 100 has applied request information, the fax communication unit 207 sends an operation checking image to the fax machine 100. If an operation fault, such as a fax sending error, is detected in the fax machine 100, after the fax machine 100 has applied request information, the fax communication unit 207 receives an operation checking image from the fax machine 100 via the fax communication line 400 and sends it to the comparing unit 206.

The data communication unit 208 performs data communication with the fax machine 100 via the data communication line 500 and also performs data communication with the maintenance server 300 via the data communication line 600. Upon the occurrence of an operation fault in the fax machine 100, the data communication unit 208 receives information indicating the occurrence of an operation fault and setting information via the data communication line 500. The data communication unit 208 also sends request information input from the request information manager 203 to the fax machine 100 via the data communication line 500 in response to polling from the fax machine 100. The data communication unit 208 also sends image data representing an operation checking image generated by the operation checking image generator 205 to the fax machine 100 via the data communication line 500.

Figure 6:
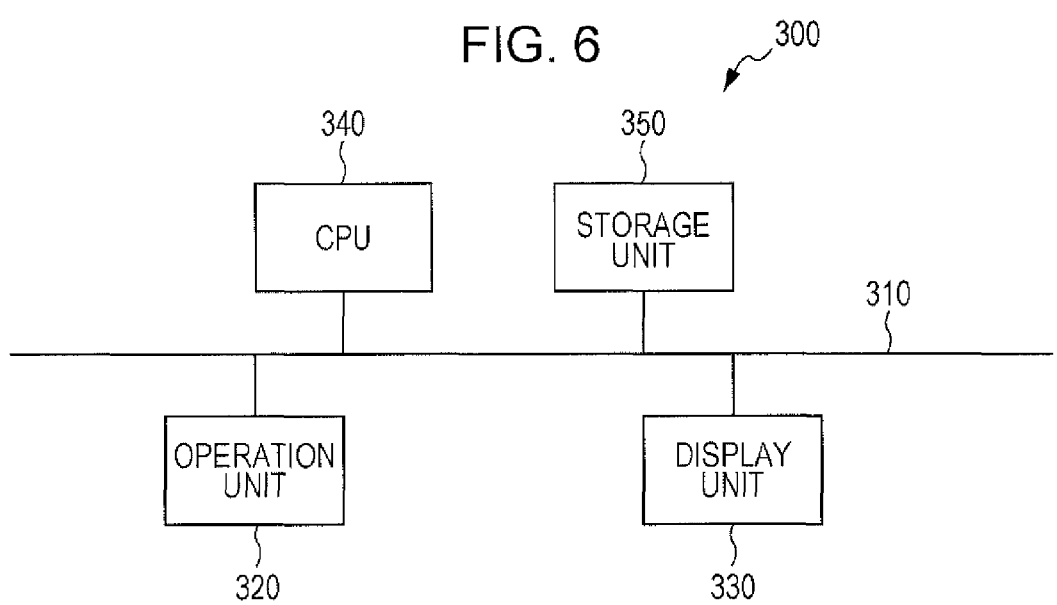
FIG. 6 is a block diagram illustrating an example of the hardware configuration of a maintenance server according to an exemplary embodiment of the invention.

FIG. 6 is a block diagram illustrating an example of the hardware configuration of the maintenance server 300 according to an exemplary embodiment of the invention. The maintenance server 300 includes an operation unit 320, a display unit 330, a CPU 340, and a storage unit 350, which are connected to each other via a bus 310. The operation unit 320 is constituted by a keyboard, a mouse, and so on, and receives an operation performed by an operator of the maintenance server 300. The display unit 330 is a display, such as a liquid crystal display. The CPU 340 is operated by a program stored in the storage unit 350, and implements various functions, which will be discussed later. The storage unit 350 is a storage element, such as a hard disk or a memory.

Figure 7:
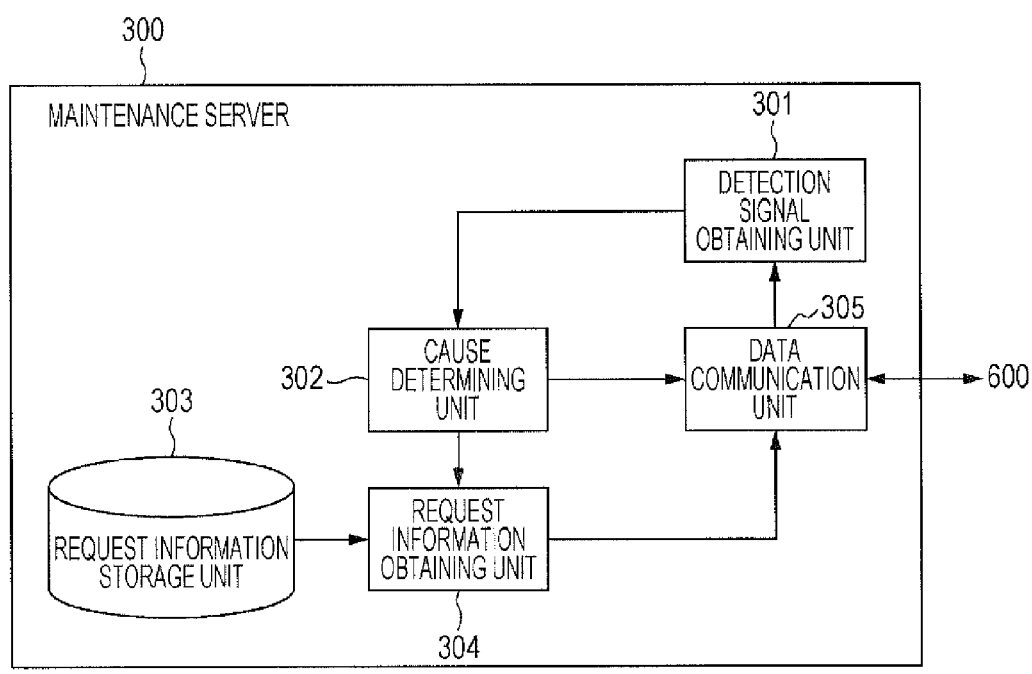
FIG. 7 is a functional block diagram illustrating examples of the functions of a maintenance server according to an exemplary embodiment of the invention.

FIG. 7 is a functional block diagram illustrating examples of the functions of the maintenance server 300 according to an exemplary embodiment of the invention. The maintenance server 300 includes a detection signal obtaining unit 301, a cause determining unit 302, a request information storage unit 303, a request information obtaining unit 304, and a data communication unit 305. The detection signal obtaining unit 301, the cause determining unit 302, the request information obtaining unit 304, and the data communication unit 305 are functions implemented by the CPU 340 which is operated by the program stored in the storage unit 350. The request information storage unit 303 is constituted by a storage element, such as a hard disk or a memory, which forms the storage unit 350.

The detection signal obtaining unit 301 obtains information indicating the occurrence of an operation fault in the fax machine 100 and obtained setting information from a signal received from the management server 200 and outputs these items of information to the cause determining unit 302.

The cause determining unit 302 determines the cause of an operation fault occurring in the fax machine 100, on the basis of information indicating the occurrence of the operation fault and obtained setting information input from the detection signal obtaining unit 301, and outputs information indicating a determination result to the request information obtaining unit 304 and the data communication unit 305.

In the request information storage unit 303, items of request information for handling operation faults which may occur in the fax machine 100 are stored in advance in association with items of information indicating the causes of operation faults.

The request information obtaining unit 304 obtains request information for handling a determined cause from the request information storage unit 303, on the basis of information indicating a determination result input from the cause determining unit 302, and outputs the obtained request information to the data communication unit 305.

The data communication unit 305 performs data communication with the management server 200 via the data communication line 600. The data communication unit 305 sends information indicating a determination result input from the cause determining unit 302 and request information input from the request information obtaining unit 304 to the management server 200.

Operations performed by the fax maintenance system 10 according to an exemplary embodiment of the invention will be described below with reference to flowcharts. An operation performed by the fax machine 100 upon detecting an operation fault will first be discussed.

Figure 8:
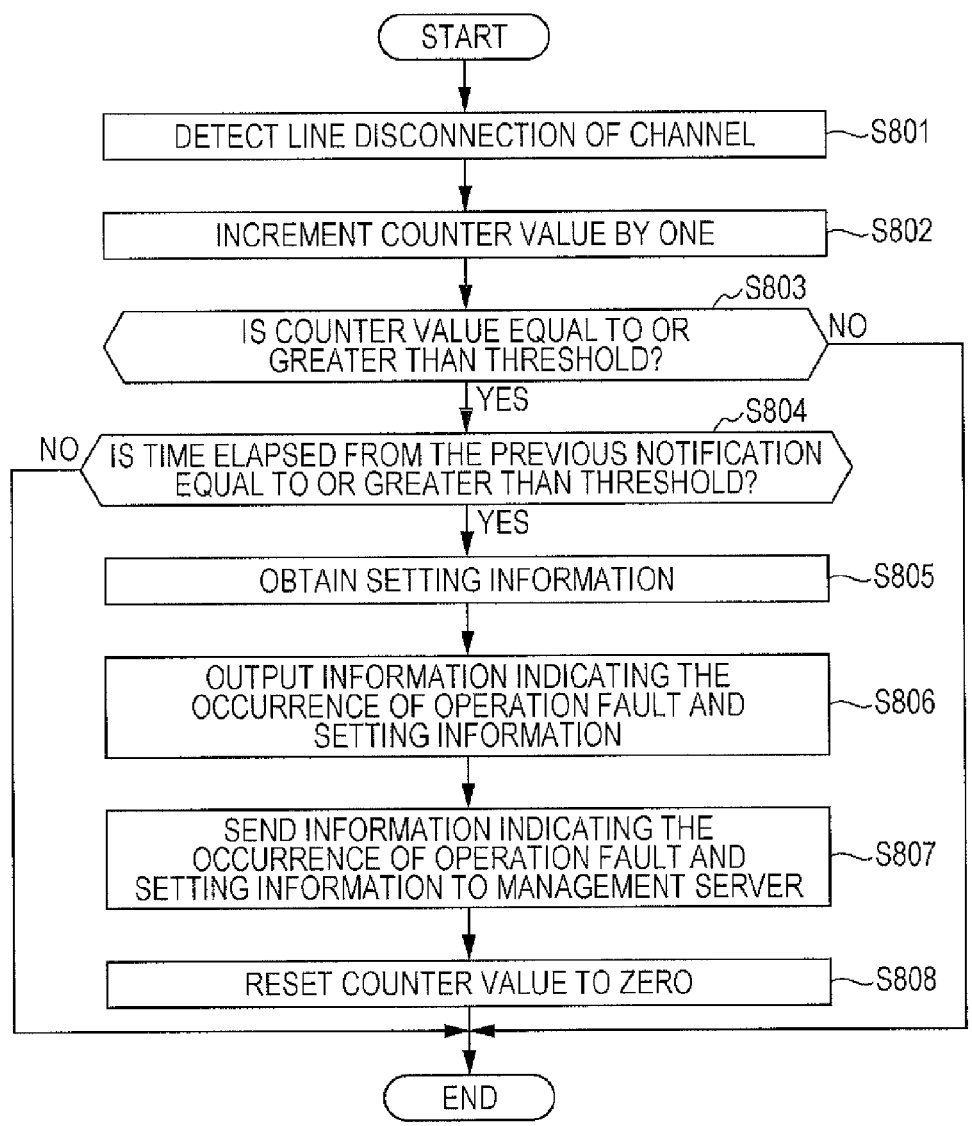
FIG. 8 is a flowchart illustrating an operation performed by a fax machine upon detecting line disconnection of a fax communication channel.

FIG. 8 is a flowchart illustrating an operation performed by the fax machine 100 upon detecting line disconnection of a fax communication channel. In step S801, the operation fault detector 101 of the fax machine 100 detects line disconnection of a fax communication channel. Then, in step S802, the determining unit 102 increments, by one, the value of a built-in counter for detecting the number of occurrences of line disconnection.

Then, in step S803, the determining unit 102 determines whether or not the counter value is equal to or greater than a predetermined threshold. If the counter value is smaller than the predetermined threshold, the processing is terminated.

If it is determined in step S803 that the counter value is equal to or greater than the predetermined threshold, the process proceeds to step S804. In step S804, the determining unit 102 determines whether or not the time elapsed from the previous notification of line disconnection is equal to or greater than a predetermined threshold. If the elapsed time is smaller than the predetermined threshold, the processing is terminated.

If it is determined in step S804 that the elapsed time is equal to or greater than the predetermined threshold, the process proceeds to step S805. In step S805, the notification output unit 103 obtains setting information concerning line disconnection. Then, in step S806, the notification output unit 103 outputs information indicating the occurrence of an operation fault (line disconnection) and the setting information obtained in step S805 to the data communication unit 107.

In step S807, the data communication unit 107 sends the information indicating the occurrence of an operation fault and the setting information input from the notification output unit 103 to the management server 200 via the data communication line 500.

Then, in step S808, the determining unit 102 resets the counter value to 0. The operation performed by the fax machine 100 upon detecting line disconnection of a fax communication channel has been completed.

Figure 9:
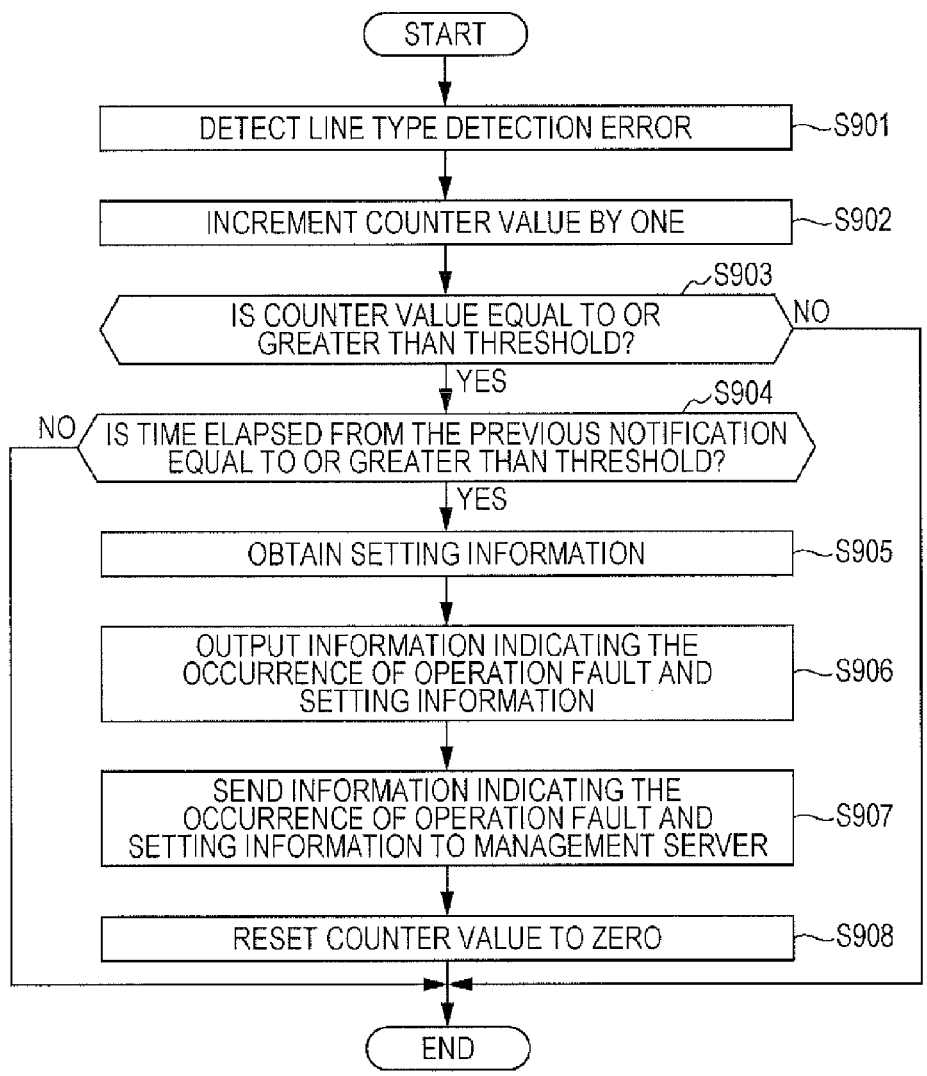
FIG. 9 is a flowchart illustrating an operation performed by a fax machine upon detecting a line type detection error in fax communication.

FIG. 9 is a flowchart illustrating an operation performed by the fax machine 100 upon detecting a line type detection error in fax communication. In step S901, the operation fault detector 101 of the fax machine 100 detects a line type detection error. Then, in step S902, the determining unit 102 increments, by one, the value of a built-in counter for detecting the number of times that a line type detection error has been detected.

Then, in step S903, the determining unit 102 determines whether or not the counter value is equal to or greater than a predetermined threshold. If the counter value is smaller than the predetermined threshold, the processing is terminated.

If it is determined in step S903 that the counter value is equal to or greater than the predetermined threshold, the process proceeds to step S904. In step S904, the determining unit 102 determines whether or not the time elapsed from the previous notification of a line type detection error is equal to or greater than a predetermined threshold. If the elapsed time is smaller than the predetermined threshold, the processing is terminated.

If it is determined in step S904 that the elapsed time is equal to or greater than the predetermined threshold, the process proceeds to step S905. In step S905, the notification output unit 103 obtains setting information concerning the line type detection error. Then, in step S906, the notification output unit 103 outputs information indicating the occurrence of an operation fault (line type detection error) and the setting information obtained in step S905 to the data communication unit 107.

In step S907, the data communication unit 107 sends the information indicating the occurrence of an operation fault and the setting information input from the notification output unit 103 to the management server 200 via the data communication line 500.

Then, in step S908, the determining unit 102 resets the counter value to 0. The operation performed by the fax machine 100 upon detecting a line type detection error in fax communication has been completed.

Figure 10:
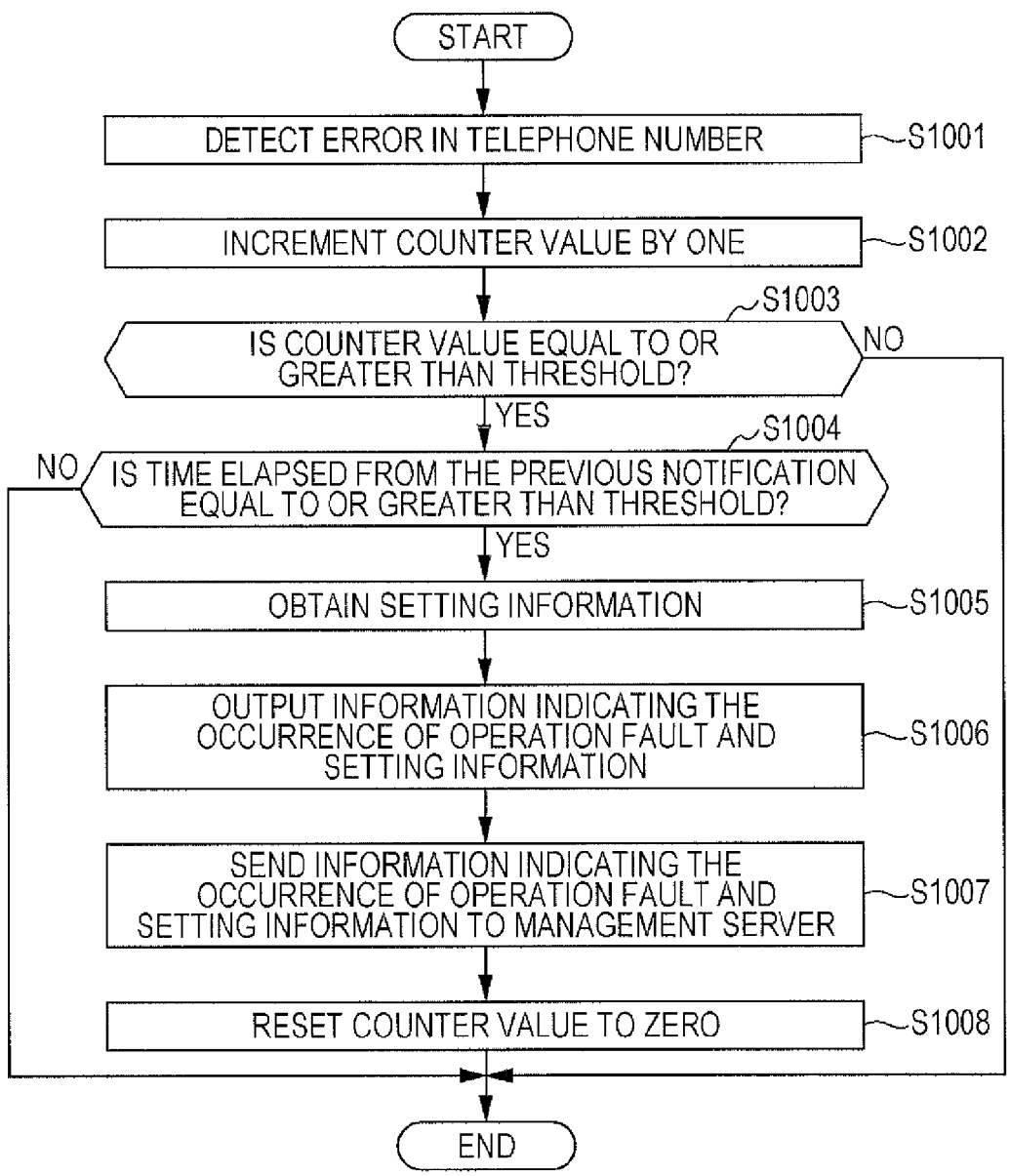
FIG. 10 is a flowchart illustrating an operation performed by a fax machine upon detecting an error in a telephone number.

FIG. 10 is a flowchart illustrating an operation performed by the fax machine 100 upon detecting an error in a telephone number. In step S1001, the operation fault detector 101 of the fax machine 100 detects an error in a telephone number. Then, in step S1002, the determining unit 102 increments, by one, the value of a built-in counter for detecting the number of times that an error in a telephone number has been detected.

Then, in step S1003, the determining unit 102 determines whether or not the counter value is equal to or greater than a predetermined threshold. If the counter value is smaller than the predetermined threshold, the processing is terminated.

If it is determined in step S1003 that the counter value is equal to or greater than the predetermined threshold, the process proceeds to step S1004. In step S1004, the determining unit 102 determines whether or not the time elapsed from the previous notification of an error in a telephone number is equal to or greater than a predetermined threshold. If the elapsed time is smaller than the predetermined threshold, the processing is terminated.

If it is determined in step S1004 that the elapsed time is equal to or greater than the predetermined threshold, the process proceeds to step S1005. In step S1005, the notification output unit 103 obtains setting information concerning an error in a telephone number. Then, in step S1006, the notification output unit 103 outputs information indicating the occurrence of an operation fault (error in a telephone number) and the setting information obtained in step S1005 to the data communication unit 107.

In step S1007, the data communication unit 107 sends the information indicating the occurrence of an operation fault and the setting information input from the notification output unit 103 to the management server 200 via the data communication line 500.

Then, in step S1008, the determining unit 102 resets the counter value to 0. The operation performed by the fax machine 100 upon detecting an error in a telephone number has been completed.

Figure 11:
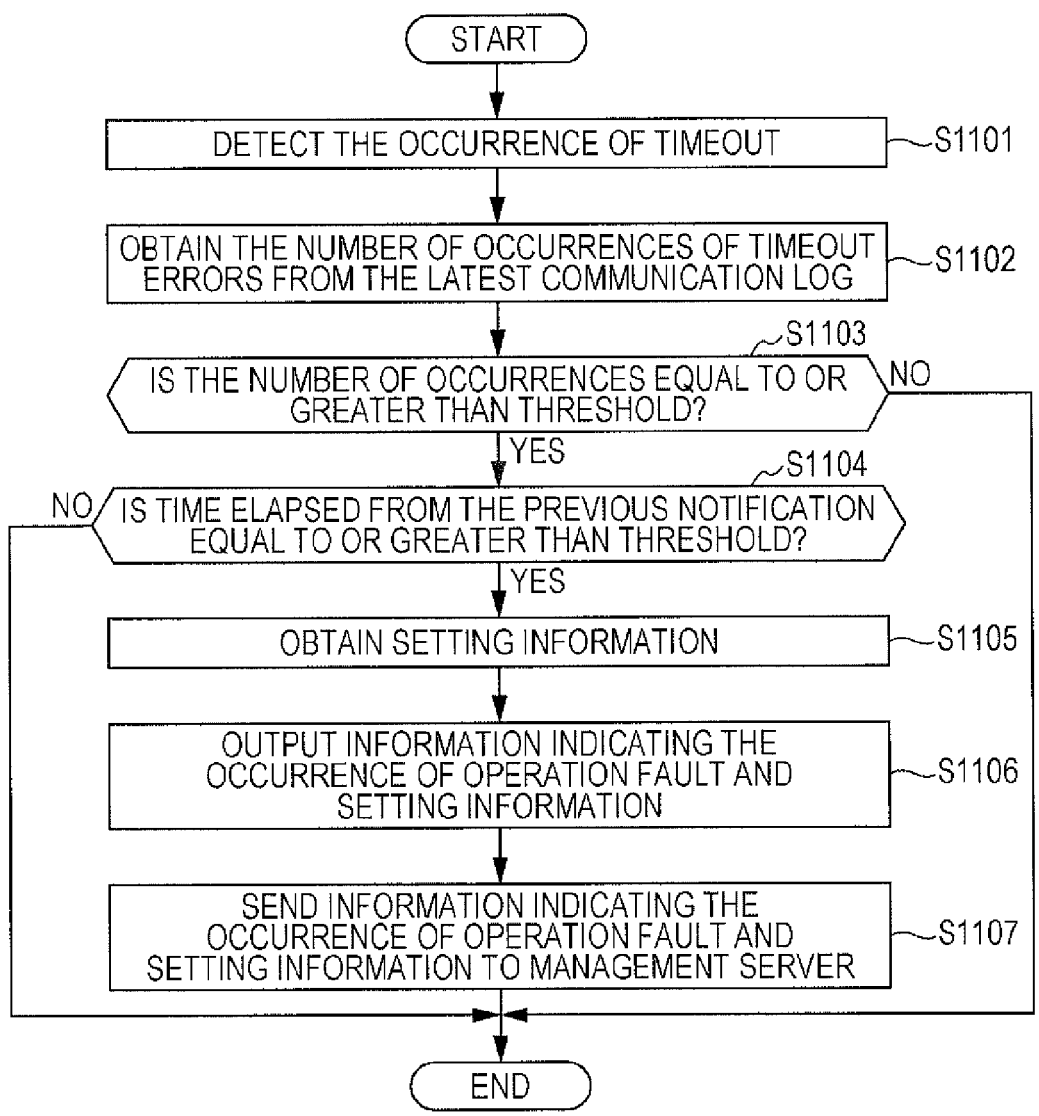
FIG. 11 is a flowchart illustrating an operation performed by a fax machine upon detecting the occurrence of timeout.

FIG. 11 is a flowchart illustrating an operation performed by the fax machine 100 upon detecting the occurrence of timeout. In step S1101, the operation fault detector 101 of the fax machine 100 detects the occurrence of timeout. Then, in step S1102, the determining unit 102 obtains the number of occurrences of timeout errors from a communication log including a predetermined number of latest communications.

Then, in step S1103, the determining unit 102 determines whether or not the obtained number of occurrences of timeout errors is equal to or greater than a predetermined threshold. If the obtained number is smaller than the predetermined threshold, the processing is terminated.

If it is determined in step S1103 that the obtained number is equal to or greater than the predetermined threshold, the process proceeds to step S1104. In step S1104, the determining unit 102 determines whether or not the time elapsed from the previous notification of the occurrence of a timeout error is equal to or greater than a predetermined threshold. If the elapsed time is smaller than the predetermined threshold, the processing is terminated.

If it is determined in step S1104 that the elapsed time is equal to or greater than the predetermined threshold, the process proceeds to step S1105. In step S1105, the notification output unit 103 obtains setting information concerning timeout. Then, in step S1106, the notification output unit 103 outputs information indicating the occurrence of an operation fault (timeout) and the setting information obtained in step S1105 to the data communication unit 107.

In step S1107, the data communication unit 107 sends the information indicating the occurrence of an operation fault and the setting information input from the notification output unit 103 to the management server 200 via the data communication line 500. Then, the operation performed by the fax machine 100 upon detecting the occurrence of timeout has been completed.

A description will now be given of an operation performed by the maintenance server 300 upon receiving information indicating that an operation fault in the fax machine 100 has been detected from the management server 200.

Figure 12:
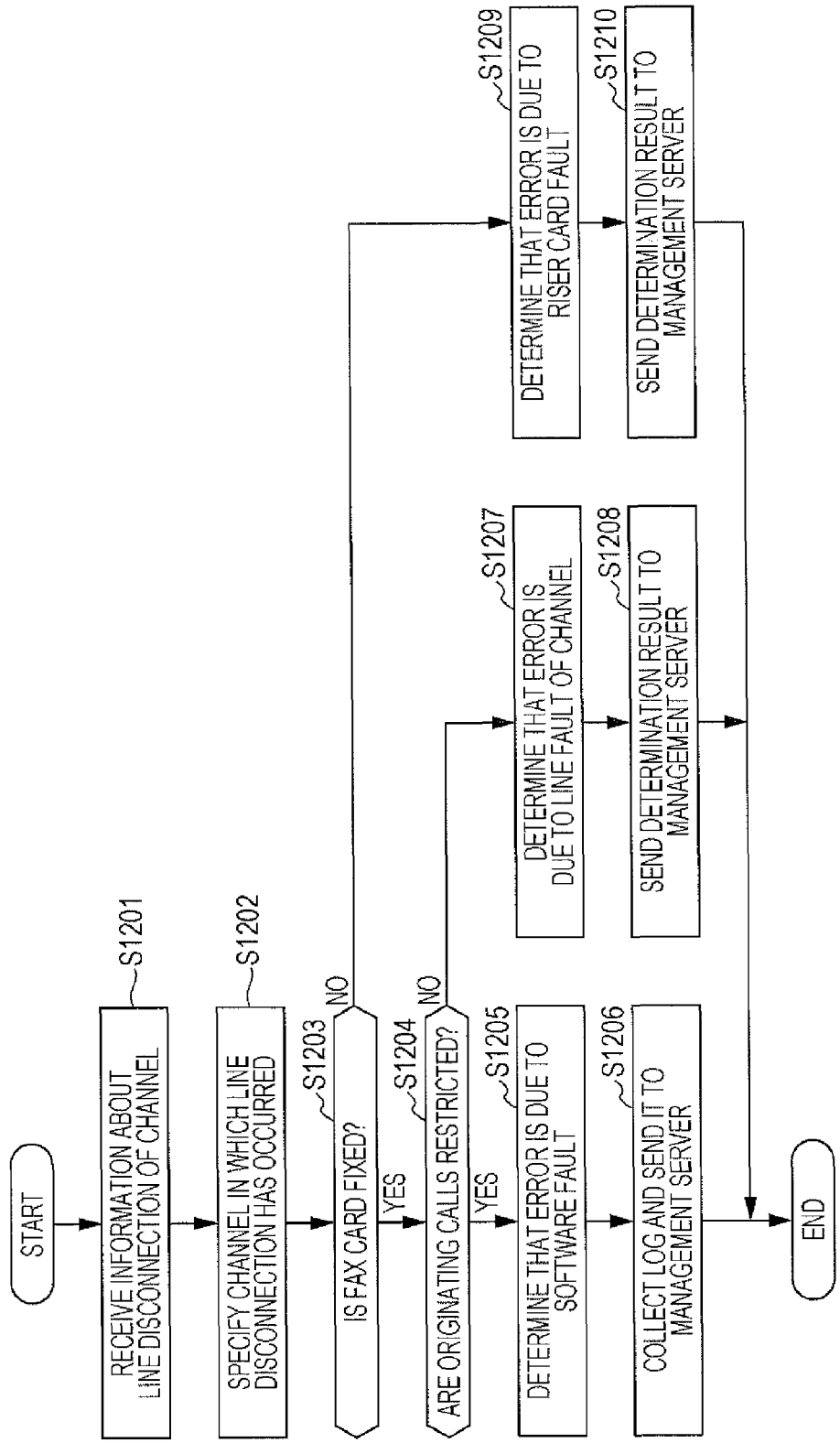
FIG. 12 is a flowchart illustrating an operation performed by a maintenance server upon detecting line disconnection of a fax communication channel.

FIG. 12 is a flowchart illustrating an operation performed by the maintenance server 300 upon detecting line disconnection of a fax communication channel. In step S1201, the maintenance server 300 receives information indicating line disconnection of a channel from the management server 200. Then, in step S1202, the cause determining unit 302 of the maintenance server 300 refers to the content of the information and specifies the channel in which line disconnection has occurred.

In step S1203, the cause determining unit 302 refers to the setting information sent from the fax machine 100 and checks whether or not a fax card corresponding to the specified channel is fixed. If a corresponding fax card is not fixed, the process proceeds to step S1209. In step S1209, the cause determining unit 302 determines that line disconnection is due to a fault of a riser card. Then, in step S1210, the cause determining unit 302 sends an instruction to replace the fax riser card to the management server 200. Upon receiving this instruction, the management server 200 displays a message indicating this instruction on the display unit 230.

If it is determined in step S1203 that a fax card corresponding to the specified channel is fixed, the process proceeds to step S1204. In step S1204, the cause determining unit 302 refers to the setting information and checks whether or not originating calls are restricted in the fax machine 100. If it is determined that originating calls are restricted in the fax machine 100, the process proceeds to step S1205. In step S1205, the cause determining unit 302 determines that line disconnection is due to a software fault. Then, in step S1206, the cause determining unit 302 collects the communication log of the channel specified in step S1202 and sends the communication log together with information indicating that line disconnection may be due to a software fault to the management server 200. Upon receiving this information, the management server 200 displays a message indicating this information on the display unit 230.

If it is determined in step S1204 that originating calls are not restricted, the process proceeds to step S1207. In step S1207, the cause determining unit 302 determines that line disconnection is due to a line fault of the channel. Then, in step S1208, the cause determining unit 302 sends an instruction to check the channel line to the management server 200. Upon receiving this instruction, the management server 200 displays a message indicating this instruction on the display unit 230. Then, the operation performed by the maintenance server 300 upon detecting line disconnection of a fax communication channel has been completed.

Figure 13:
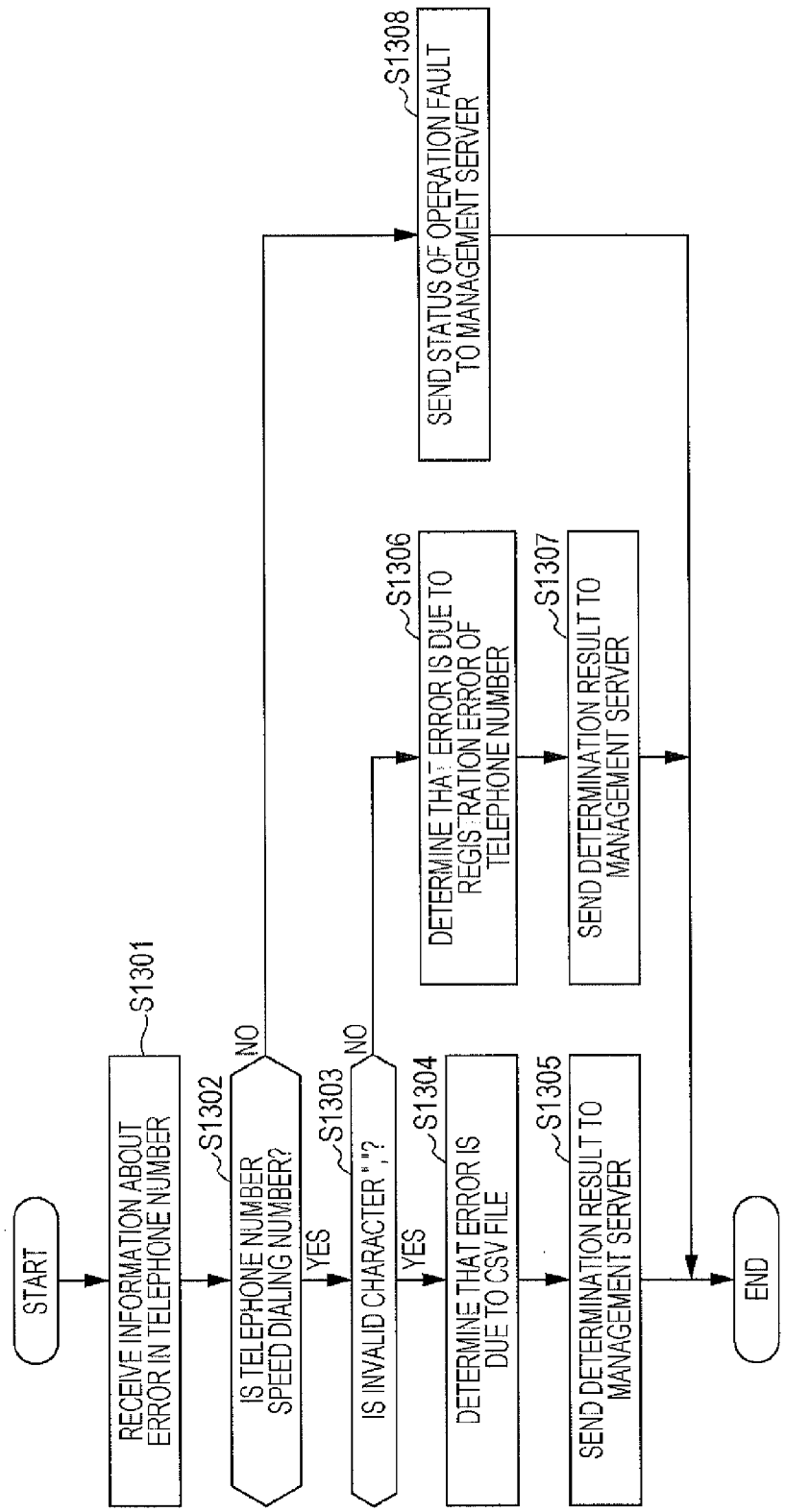
FIG. 13 is a flowchart illustrating an operation performed by a maintenance server upon detecting an error in a telephone number.

FIG. 13 is a flowchart illustrating an operation performed by the maintenance server 300 upon detecting an error in a telephone number. In step S1301, the maintenance server 300 receives information indicating an error in a telephone number from the management server 200. Then, in step S1302, the cause determining unit 302 of the maintenance server 300 refers to the content of the information and checks whether or not this telephone number is a speed dialing number.

If it is determined in step S1302 that this telephone number is not a speed dialing number, the cause determining unit 302 determines that an error is not due to the assumed causes, and sends information indicating the status of the operation fault to the management server 200 in step S1308. Upon receiving this information, the management server 200 displays a message indicating this information on the display unit 230.

If it is determined in step S1302 that this telephone number is a speed dialing number, the process proceeds to step S1303. In step S1303, the cause determining unit 302 determines whether or not the invalid character is ",". If it is determined in step S1303 that the invalid character is ",", the cause determining unit 302 determines in step S1304 that an error is due to a database (CSV file) describing telephone numbers. Then, in step S1305, the cause determining unit 302 sends a determination result to the management server 200. Upon receiving this determination result, the management server 200 displays a message indicating this determination result on the display unit 230.

If it is determined in step S1303 that the invalid character is not ",", the process proceeds to step S1306. The cause determining unit 302 determines in step S1306 that an error is due to a registration error of the telephone number, and sends a determination result to the management server 200 in step S1307. Upon receiving this determination result, the management server 200 displays a message indicating this determination result on the display unit 230. Then, the operation performed by the maintenance server 300 upon detecting an error in a telephone number has been completed.

An operation for applying request information to the fax machine 100 and for checking the result obtained by applying the request information will be described below.

Figure 14A:
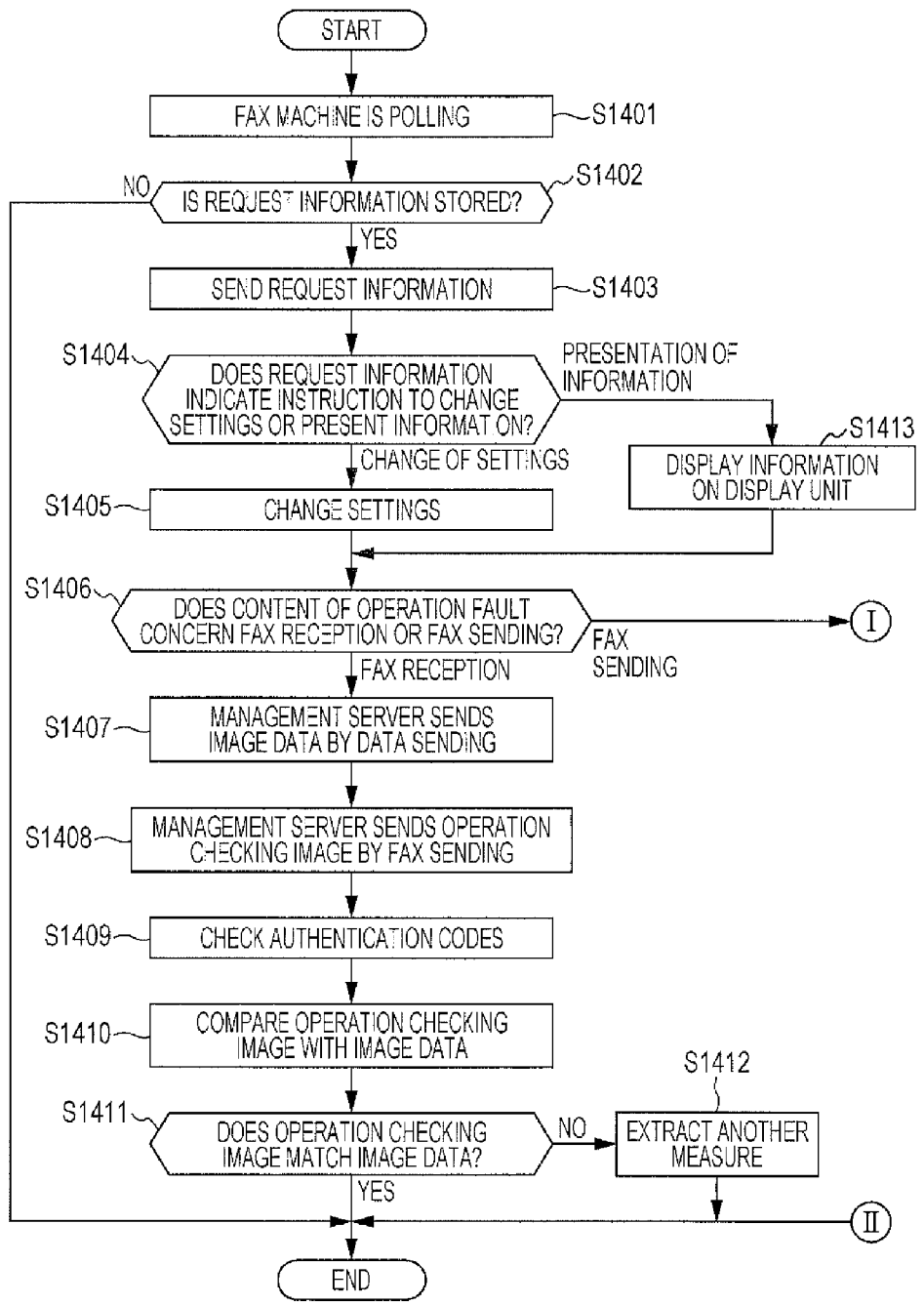
FIGS. 14A and 14B are flowcharts illustrating an operation for applying request information to a fax machine and for checking the result obtained by applying the request information.
Figure 14B:
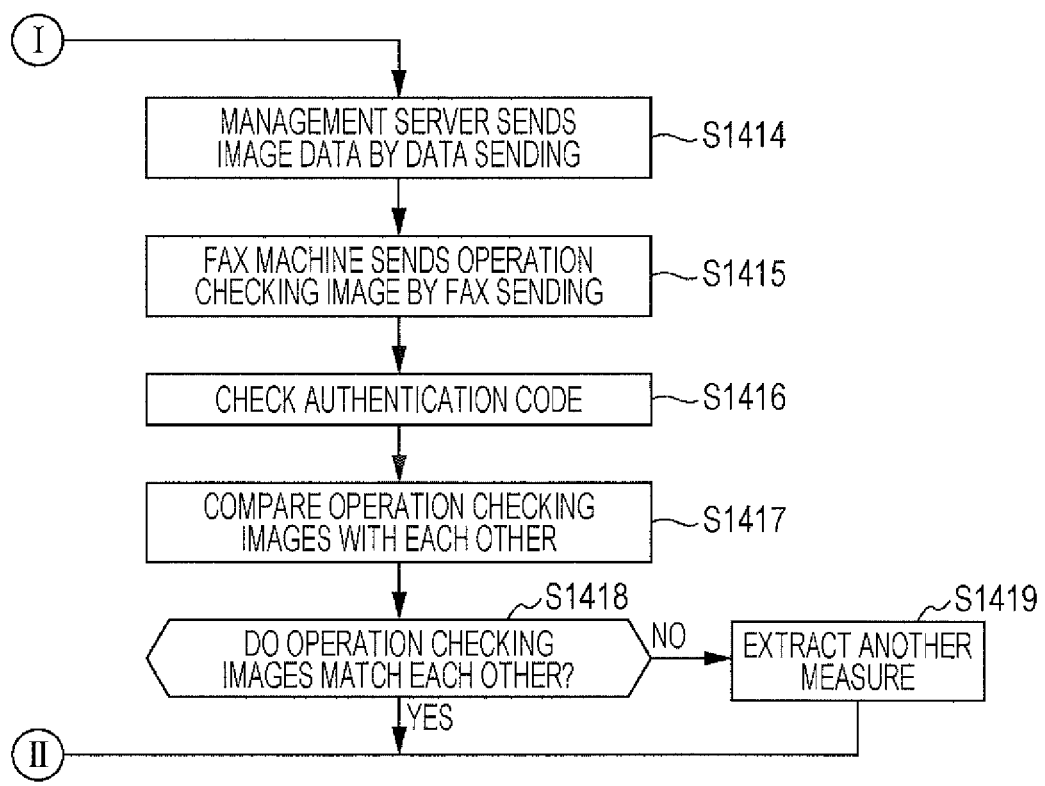

FIGS. 14A and 14B are flowcharts illustrating an operation for applying request information to the fax machine 100 and for checking the result obtained by applying the request information. In step S1401, the fax machine 100 performs polling to ask for request information stored in the management server 200 at a predetermined timing.

In step S1402, in response to polling performed in step S1401, the management server 200 checks whether or not request information to be applied to the fax machine 100 is stored in the request information storage unit 204. If request information is stored in the request information storage unit 204, the process proceeds to step S1403. In step S1403, the management server 200 sends the request information to the fax machine 100 via the data communication unit 208. If request information is not stored in the request information storage unit 204, the management server 200 informs the fax machine 100 that request information is not stored, and terminates the processing.

Upon receiving the request information, the request applying unit 104 of the fax machine 100 checks the content of the request information and then determines in step S1404 whether or not the request information indicates an instruction to change the settings or to present certain information (replacement of devices or request of checking) to a user.

If it is determined in step S1404 that the request information indicates an instruction to change the settings, the process proceeds to step S1405. In step S1405, the request applying unit 104 changes the settings in accordance with the request information. If it is determined in step S1404 that the request information indicates an instruction to present information to the user, the process proceeds to step S1413. In step S1413, the request applying unit 104 presents information based on the request information to the user by displaying it on the display unit 130.

Then, in step S1406, the request applying unit 104 checks the content of the operation fault occurring in the fax machine 100 and determines whether the operation fault concerns fax reception processing or fax sending processing.

If it is determined in step S1406 that the content of the operation fault concerns fax reception, the request applying unit 104 informs the management server 200 that the application of request information has been completed. Then, in step S1407, in response to this notification, the data communication unit 208 of the management server 200 sends image data representing an operation checking image generated by the operation checking image generator 205 to the fax machine 100 by means of data sending. In step S1408, the fax communication unit 207 of the management server 200 sends an operation checking image to the fax machine 100 by means of fax sending.

Upon receiving the image data and the operation checking image, in step S1409, the comparing unit 105 of the fax machine 100 checks the authentication codes appended to the image data and the operation checking image. Then, in step S1410, the comparing unit 105 compares the image data and the operation checking image with each other. Then, the comparing unit 105 determines in step S1411 whether or not the image data matches the operation checking image. If it is determined in step S1411 that the image data matches the operation checking image, the fax machine 100 informs the management server 200 that the problem of the operation fault has been fixed. Then, the operation has been completed. If it is determined in step S1411 that the image data does not match the operation checking image, the process proceeds to step S1412. In step S1412, the fax machine 100 informs the management server 200 that the problem of the operation fault has not been fixed and extracts another measure to fix the problem of the operation fault.

If it is determined in step S1406 that the content of the operation fault concerns fax sending, the request applying unit 104 informs the management server 200 that the application of request information has been completed. Then, in response to the notification, in step S1414, the data communication unit 208 of the management server 200 sends image data representing an operation checking image generated by the operation checking image generator 205 to the fax machine 100 by means of data sending. In step S1415, the fax communication unit 106 of the fax machine 100 sends an operation checking image based on the received image data to the management server 200 by means of fax sending.

Upon receiving the operation checking image, in step S1416, the comparing unit 206 of the management server 200 checks the authentication code appended to the operation checking image. Then, in step S1417, the comparing unit 206 compares the received operation checking image with the operation checking image generated by the operation checking image generator 205. Then, the comparing unit 206 determines in step S1418 whether or not these operation checking images match each other. If it is determined in step 91418 that these operation checking images match each other, the processing is terminated. If it is determined in step S1418 that the operation checking images do not match each other, the process proceeds to step S1419. In step S1419, the management server 200 extracts another measure to fix the problem of the operation fault. Then, the operation for applying request information to the fax machine 100 and for checking the result obtained by applying the request information when the request information is stored in the management server 200 has been completed.

With the above-described configuration, upon the occurrence of an operation fault of a predetermined type, the fax machine 100 outputs information indicating the occurrence of an operation fault and setting information concerning the operation fault. Thus, it is possible to provide the fax maintenance system 10 in which maintenance is more speedily carried out than in a known system that requires a user to contact a maintenance center.

The checking and handling of an operation fault is not restricted to the above-described operations. For example, it is assumed that an operation fault, such as a failure to detect a dial tone due to a setting error of the fax machine 100 in the contract of a line or the connection status has occurred. In this case, the cause determining unit 302 of the maintenance server 300 may first determine the line type. Then, the maintenance server 300 may generate request information and send it to the fax machine 100 via the management server 200 or may directly change the settings of the fax machine 100 so as to change the line type in the fax machine 100. Then, the maintenance server 300 may send and receive the above-described operation checking images, thereby checking whether or not the problem of the operation fault has been fixed.

If timeout occurs or the maximum resending number exceeds in fax communication with a specific partner, the cause determining unit 302 of the maintenance server 300 may first determine that the network used for communication is not suitable. Then, the maintenance server 300 may generate request information and send it to the fax machine 100 via the management server 200 to change the network or may directly perform processing for changing the network. Then, the maintenance server 300 may send and receive the above-described operation checking images, thereby checking whether or not the problem of the operation fault has been fixed.

In the above-described embodiment, the fax maintenance system 10 includes the fax machine 100, the management server 200, and the maintenance server 300. However, the present invention is not restricted to this configuration. For example, the functions of the management server 200 and the maintenance server 300 may be integrated into a single information processing apparatus. The fax machine 100 may have the functions of the management server 200 and the maintenance server 300.

The operations of the fax machine 100, the management server 200, and the maintenance server 300 are implemented by operating programs stored in the storage units of the fax machine 100, the management server 200, and the maintenance server 300, respectively. These programs may be provided by communication, or they may be recorded in a computer readable storage medium, such as a compact disc read only memory (CD-ROM), and be provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an operation fault detector that detects an operation fault of a predetermined type which occurs in the information processing apparatus;
an output unit that outputs a notification which contains occurrence information indicating an occurrence of the operation fault of the predetermined type and setting information concerning the operation fault of the predetermined type;
a first receiver that receives an operation checking image from an external apparatus via a first communication line;
a second receiver that receives image data of the same operation checking image from the external apparatus via a second communication line that is different from the first communication line; and
a comparing unit that compares the operation checking image with the image data of the same operation checking image, wherein
the operation checking image and the image data of the operation checking image are received from the external apparatus in response to the operation fault being related to faulty information receiving of the information processing apparatus.

2. The information processing apparatus according to claim 1, wherein
the information processing apparatus is a fax machine,
the first receiver receives the operation checking image via the first communication line by fax receiving,
the second receiver receives the image data via the second communication line by data receiving, and
the comparing unit compares the operation checking image received by fax receiving with the image data received by data receiving in order to determine whether the operation fault has been fixed.

3. A management server comprising:
an operation checking image generator that generates an operation checking image;
a transmitter that transmits image data of the same operation checking image to an external apparatus via a first communication line in response to a notification received from the external apparatus regarding an operation fault of the external apparatus;
a receiver that receives the same operation checking image from the external apparatus via a second communication line that is different from the first communication line; and
a comparing unit that compares the operation checking image with the image data of the same operation checking image, wherein
the image data of the operation checking image is transmitted to the external apparatus and the operation checking image is received from the external apparatus in response to the operation fault being related to faulty information sending of the external apparatus.

4. A non-transitory computer readable medium storing a program causing a computer to execute a process, the process comprising:
detecting an operation fault of a predetermined type which occurs in an information processing apparatus;
outputting a notification which contains occurrence information indicating an occurrence of the operation fault of the predetermined type and setting information concerning the operation fault of the predetermined type;
receiving an operation checking image from an external apparatus via a first communication line;

receiving image data of the same operation checking image from the external apparatus via a second communication line that is different from the first communication line; and comparing the operation checking image with the image data of the same operation checking image, wherein the operation checking image and the image data of the operation checking image are received from the external apparatus in response to the operation fault being related to faulty information receiving of the information processing apparatus.

5. A fax maintenance system comprising:

a fax machine and a management server, the fax machine having
- an operation fault detector that detects an operation fault of a predetermined type which occurs in the fax machine;
- an output unit that outputs a notification which contains occurrence information indicating an occurrence of the operation fault of the predetermined type and setting information concerning the operation fault of the predetermined type;
- a first receiver that receives an operation checking image from the management server via a first communication line by fax receiving;
- a second receiver that receives image data of the same operation checking image from the management server via a second communication line by data receiving, the second communication line being different from the first communication line; and
- a comparing unit that compares the operation checking image with the image data of the same operation checking image, and the management server having
- an operation checking image generator that generates the operation checking image;
- a transmitter that transmits the image data of the operation checking image to the fax machine via the second communication line in response to the notification received from the fax machine regarding the operation fault of the fax machine;
- a receiver that receives the operation checking image from the fax machine via the first communication line; and
- a comparing unit that compares the operation checking image with the image data of the same operation checking image, wherein the operation checking image and the image data of the operation checking image are received by the fax machine from the management server in response to the operation fault being related to faulty information receiving of the fax machine, and the image data of the operation checking image is transmitted by the management server to the fax machine and the operation checking image is received by the management server from the fax machine in response to the operation fault being related to faulty information sending of the fax machine.

* * * * *